United States Patent
Kudo et al.

(10) Patent No.: US 12,420,657 B2
(45) Date of Patent: Sep. 23, 2025

(54) SERVER DEVICE AND ELECTRICITY TRANSACTION SYSTEM

(71) Applicant: TOYOTA JIDOSHA KABUSHIKI KAISHA, Toyota (JP)

(72) Inventors: Yuki Kudo, Susono (JP); Kazutaka Kimura, Mishima (JP); Kazuki Obata, Susono (JP); Hiromitsu Kigure, Ashigarakami-gun (JP); Satoshi Kikuchi, Hadano (JP); Yuta Maniwa, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 562 days.

(21) Appl. No.: 17/931,318

(22) Filed: Sep. 12, 2022

(65) Prior Publication Data

US 2023/0109041 A1    Apr. 6, 2023

(30) Foreign Application Priority Data

Oct. 4, 2021 (JP) .................................. 2021-163318

(51) Int. Cl.
    *B60L 53/63*      (2019.01)
    *B60L 53/30*      (2019.01)
    *B60L 53/64*      (2019.01)

(52) U.S. Cl.
    CPC ............. *B60L 53/63* (2019.02); *B60L 53/305* (2019.02); *B60L 53/64* (2019.02)

(58) Field of Classification Search
None
See application file for complete search history.

(56) References Cited

U.S. PATENT DOCUMENTS

| | | | | |
|---|---|---|---|---|
| 8,154,246 B1 * | 4/2012 | Heitmann | ............. | B60L 53/305 320/155 |
| 8,266,075 B2 * | 9/2012 | Ambrosio | ............. | B60L 53/665 705/17 |
| 8,521,599 B2 * | 8/2013 | Rivers, Jr. | ............... | B60L 53/63 705/16 |
| 9,030,153 B2 * | 5/2015 | Littrell | .................... | G07F 17/24 705/40 |
| 9,779,365 B2 * | 10/2017 | Smullin | ................. | G06Q 10/02 |
| 11,514,544 B2 * | 11/2022 | Reaser | ................... | G06Q 50/40 |
| 2011/0140658 A1 * | 6/2011 | Outwater | ................ | B60L 53/35 320/109 |
| 2011/0184587 A1 * | 7/2011 | Vamos | .................... | G06Q 30/06 700/297 |

(Continued)

FOREIGN PATENT DOCUMENTS

| | | | | |
|---|---|---|---|---|
| AU | 2012241138 A1 * | 5/2013 | ............. | G06F 1/266 |
| JP | 201342634 A * | 2/2013 | ............. | Y02T 10/70 |

(Continued)

*Primary Examiner* — Jared Fureman
(74) *Attorney, Agent, or Firm* — Finnegan, Henderson, Farabow, Garrett and Dunner, LLP

(57) ABSTRACT

A server device includes a processor and a memory storing a program executed by the processor. The processor is configured to accept a tender for a transaction of electricity transfer in a parking lot, contract the transaction of electricity transfer corresponding to the tender, and perform charge control for charging at least one vehicle out of a plurality of vehicles located in the parking lot, the at least one vehicle having placed the tender.

9 Claims, 13 Drawing Sheets

(56) References Cited

U.S. PATENT DOCUMENTS

| | | | |
|---|---|---|---|
| 2012/0095812 A1* | 4/2012 | Stefik | G08G 1/142 |
| | | | 705/13 |
| 2012/0169283 A1* | 7/2012 | Lowenthal | G07F 15/005 |
| | | | 320/109 |
| 2017/0140349 A1* | 5/2017 | Ricci | B60L 53/63 |
| 2017/0246962 A1* | 8/2017 | Weber | B60L 53/12 |
| 2018/0178669 A1* | 6/2018 | Kudo | H02J 7/0068 |
| 2019/0355071 A1* | 11/2019 | Amano | B60L 53/665 |
| 2019/0366868 A1* | 12/2019 | Tseng | E04H 6/22 |
| 2020/0009977 A1* | 1/2020 | Park | B60L 53/35 |
| 2020/0009978 A1* | 1/2020 | Shin | H02J 7/0045 |
| 2020/0031248 A1* | 1/2020 | Kwak | G05D 1/0231 |
| 2020/0139836 A1* | 5/2020 | Sato | B60L 53/35 |
| 2020/0231058 A1 | 7/2020 | Hishida et al. | |
| 2022/0194257 A1* | 6/2022 | Hamada | B60L 53/67 |
| 2022/0305942 A1* | 9/2022 | Mannepalli | B60L 53/68 |
| 2023/0097499 A1* | 3/2023 | Kimura | B60L 53/63 |
| | | | 320/109 |
| 2024/0083286 A1* | 3/2024 | Mizuno | B60L 53/305 |

FOREIGN PATENT DOCUMENTS

| | | | | |
|---|---|---|---|---|
| JP | 2019-020900 A | | 2/2019 | |
| JP | 2019-140879 A | | 8/2019 | |
| JP | 2020-072625 A | | 5/2020 | |
| JP | 2020-115707 A | | 7/2020 | |
| JP | 2021-056666 A | | 4/2021 | |
| JP | 2023054462 A | * | 4/2023 | B60L 53/68 |

* cited by examiner

FIG. 7

UNIT INFORMATION TABLE

| ID | FORM INFORMATION | TRIP INFORMATION | SOC INFORMATION | CONNECTION INFORMATION | TENDER INFORMATION | CONTRACT INFORMATION |
|---|---|---|---|---|---|---|
| A1 | MOBILE OBJECT | T1 | S1 | D1 | B1 | Y1 |

FIG. 8

AGENT INFORMATION TABLE

| ID | FORM INFORMATION | TENDER INFORMATION | CONTRACT INFORMATION | EVALUATION INFORMATION |
|---|---|---|---|---|
| A1 | MOBILE OBJECT | a11 | a21 | a31 |
| A2 | MOBILE OBJECT | a12 | a22 | a32 |
| A3 | MOBILE OBJECT | a13 | a23 | a33 |
| ... | ... | ... | ... | ... |

FIG. 9

TRANSACTION INFORMATION TABLE

| SCHEDULED TIME OF CHARGE | CHARGER | PARKING SPACE | DEMAND-SIDE UNIT |
|---|---|---|---|
| SCHEDULED TIME A | CHARGER A | PARKING SPACE A1 | VEHICLE A |
| | | PARKING SPACE A2 | – |
| | | PARKING SPACE A3 | – |
| | | PARKING SPACE A4 | – |
| | CHARGER B | PARKING SPACE B1 | – |
| | | PARKING SPACE B2 | VEHICLE B |
| | | PARKING SPACE B3 | – |
| | | PARKING SPACE B4 | – |
| SCHEDULED TIME B | CHARGER A | PARKING SPACE A1 | – |
| | | PARKING SPACE A2 | – |
| | | PARKING SPACE A3 | VEHICLE C |
| | | PARKING SPACE A4 | – |
| | CHARGER B | PARKING SPACE B1 | – |
| | | PARKING SPACE B2 | – |
| | | PARKING SPACE B3 | – |
| | | PARKING SPACE B4 | VEHICLE D |
| ... | ... | ... | ... |

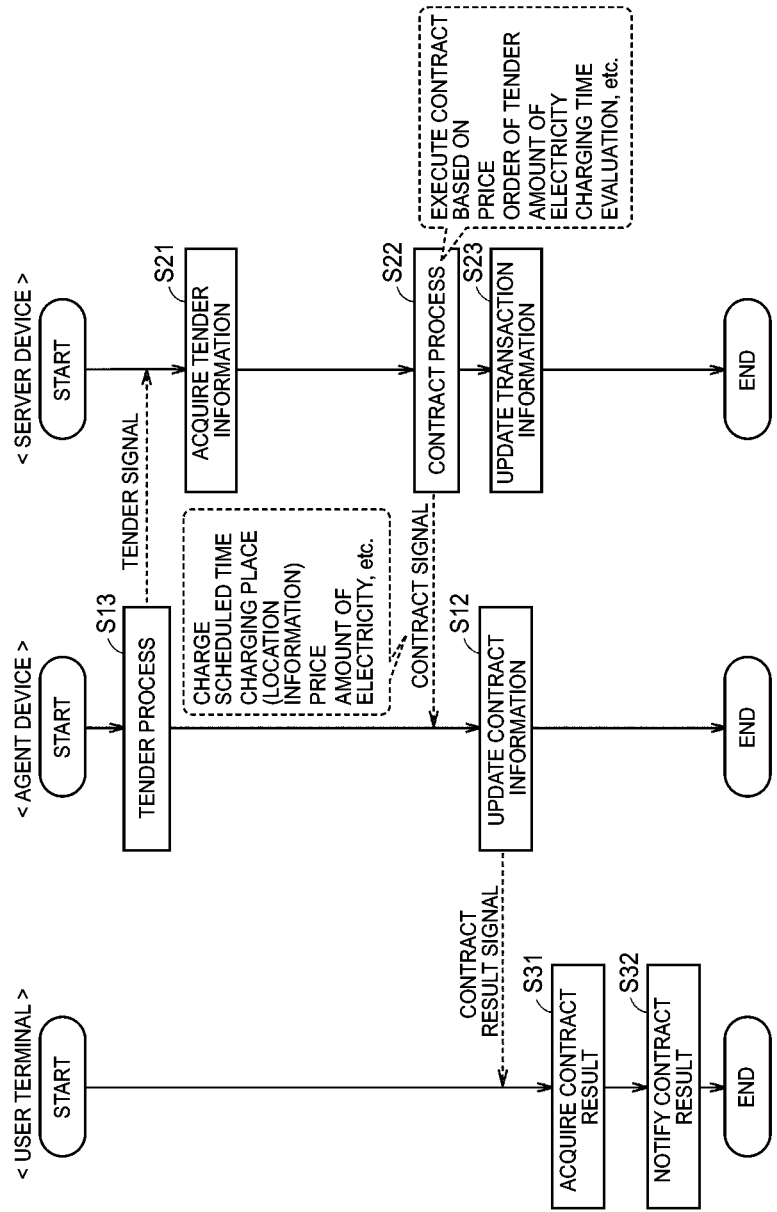

SERVER DEVICE AND ELECTRICITY TRANSACTION SYSTEM

CROSS-REFERENCE TO RELATED APPLICATION

This application claims priority to Japanese Patent Application No. 2021-163318 filed on Oct. 4, 2021, incorporated herein by reference in its entirety.

BACKGROUND

1. Technical Field

The present disclosure relates to a server device and an electricity transaction system, and more specifically, relates to a server device and an electricity transaction system that conduct a transaction of electricity transfer using a charger in a parking lot.

2. Description of Related Art

Japanese Unexamined Patent Application Publication No. 2020-72625 (JP 2020-72625 A) discloses a system that charges a vehicle located in a parking lot by using a charging robot.

SUMMARY

In the system disclosed in JP 2020-72625 A, it is possible to charge a vehicle located in a parking lot by using a charging robot, but when a plurality of vehicles is located in the parking lot, there is no consideration on how to determine the vehicle to be charged. Therefore, in the disclosed system, there are cases where the inequality occurs between the vehicle determined to be a charging object and the vehicle not determined to be a charging object.

The present disclosure has been made for solving the problem described above, and it is an object of the present disclosure to provide a technology that is able to perform an electricity transfer using a charger in a parking lot without causing the inequality between a plurality of vehicles.

A first aspect of the present disclosure relates to a server device configured to conduct a transaction of electricity transfer using a charger in a parking lot. The server device includes a processor and a memory storing a program executed by the processor. The processor is configured to accept a tender for the transaction of electricity transfer in the parking lot, contract the transaction of electricity transfer corresponding to the tender; and perform charge control for charging at least one vehicle for which the tender has been placed, out of a plurality of vehicles located in the parking lot.

With this configuration, it is possible to charge the at least one vehicle for which the tender for the transaction of electricity transfer was placed and the transaction of electricity transfer corresponding to the tender was contracted, out of the vehicles located in the parking lot. Consequently, it is possible to perform the electricity transfer using the charger in the parking lot without causing the inequality between the vehicles.

In the server device according to the first aspect, the charger may include a charging arm having a charging connector configured to be used for charging. The processor may be configured to connect the charging connector to a charging port of the at least one vehicle by operating the charging arm according to the charge control.

With this configuration, it is possible to perform the electricity transfer using the charging arm for the at least one vehicle for which the tender for the transaction of electricity transfer was placed and the transaction of electricity transfer corresponding to the tender was contracted.

In the server device according to the first aspect, the parking lot may include a transport device configured to transport each of the vehicles toward the charger. The processor may be configured to transport the at least one vehicle toward the charger by operating the transport device according to the charge control.

With this configuration, it is possible to transport the at least one vehicle for which the tender for the transaction of electricity transfer was placed and the transaction of electricity transfer corresponding to the tender was contracted, toward the charger using the transport device.

In the server device according to the first aspect, the at least one vehicle may be configured to operate according to the charge control to move toward the charger.

With this configuration, it is possible to move toward the charger the at least one vehicle for which the tender for the transaction of electricity transfer was placed and the transaction of electricity transfer corresponding to the tender was contracted.

In the server device according to the first aspect, the processor may be configured to transmit a contract result upon contracting the transaction of electricity transfer to a user terminal owned by a user of the at least one vehicle.

With this configuration, the user of the at least one vehicle for which the tender for the transaction of electricity transfer was placed and the transaction of electricity transfer corresponding to the tender was contracted is able to acquire the contract result using the user terminal, and therefore, the convenience of the user is improved.

In the server device according to the first aspect, when the number of the vehicles wishing the transactions of electricity transfer is greater than the number of the chargers, the processor may be configured to accept the tender from the at least one vehicle out of the vehicles.

With this configuration, when the number of the vehicles wishing the transactions of electricity transfer is greater than the number of the chargers, it is possible to perform the electricity transfer using the charger for the at least one vehicle for which the tender for the transaction of electricity transfer was placed and the transaction of electricity transfer corresponding to the tender was contracted.

In the server device according to the first aspect, the processor may be configured to accept a reservation for the parking lot along with the tender.

With this configuration, it is possible to allow a reservation for the parking lot along with the electricity transfer for the at least one vehicle for which the tender for the transaction of electricity transfer was placed and the transaction of electricity transfer corresponding to the tender was contracted.

In the server device according to the first aspect, when the tenders are accepted from the vehicles, the processor may be configured to contract the transaction of electricity transfer corresponding to the tender by giving an incentive based on at least one of an amount of electricity and a charging time in the transaction of electricity transfer.

With this configuration, even when the tenders are placed from the vehicles, since the transaction of electricity transfer corresponding to the tender is contracted with the incentive given based on at least one of the amount of electricity and the charging time in the transaction of electricity transfer, it is possible to properly execute a contract for the tender.

A second aspect of the present disclosure relates to an electricity transaction system configured to conduct a transaction of electricity transfer using a charger in a parking lot. The electricity transaction system includes the charger and a server device. The server device is configured to accept a tender for the transaction of electricity transfer in the parking lot, contract the transaction of electricity transfer corresponding to the tender, and perform charge control for charging at least one vehicle for which the tender has been placed, out of a plurality of vehicles located in the parking lot.

With this configuration, it is possible to charge the at least one vehicle for which the tender for the transaction of electricity transfer was placed and the transaction of electricity transfer corresponding to the tender was contracted, out of the vehicles located in the parking lot. Consequently, it is possible to perform the electricity transfer using the charger in the parking lot without causing the inequality between the vehicles.

According to the present disclosure, it is possible to perform an electricity transfer using a charger in a parking lot without causing the inequality between vehicles.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 7 is a diagram for describing an example of unit information stored in an agent device;

FIG. 8 is a diagram for describing an example of agent information stored in a server device;

FIG. 9 is a diagram for describing an example of transaction information stored in the server device;

FIG. 10 is a flowchart illustrating a processing procedure for tendering and contracting in the electricity transaction system;

DETAILED DESCRIPTION OF EMBODIMENTS

Figure 1:
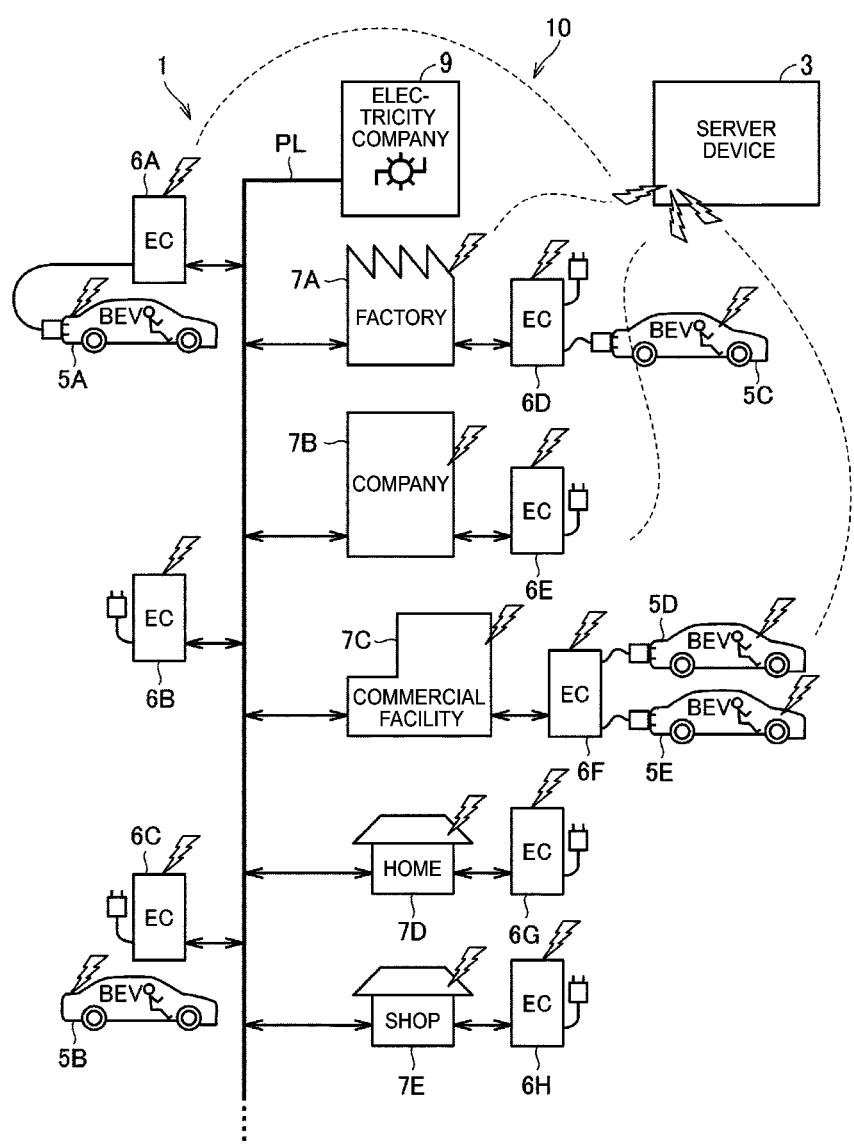
FIG. 1 is a diagram for describing an example of an electricity transaction system according to an embodiment.

Hereinafter, an embodiment of the present disclosure will be described in detail with reference to the accompanying drawings. In the drawings, the same signs are assigned to the same or corresponding elements, and a description thereof is not repeated.

Outline of Electricity Transaction System

FIG. 1 is a diagram for describing an example of an electricity transaction system 1 according to the embodiment. As illustrated in FIG. 1, the electricity transaction system 1 is configured to conduct transactions of electricity transfer between a plurality of units. Specifically, the electricity transaction system 1 includes a plurality of units each capable of performing an electricity transfer, and a server device 3. The server device 3 is configured to be able to communicate with each of the units through a network 10. Note that "electricity transfer" is a concept including at least one of situations where a first unit supplies electricity to a second unit (i.e., discharge) and where a first unit receives electricity from a second unit (i.e., charge).

The units include vehicles 5A to 5E and various buildings such as a factory 7A, a company 7B, a commercial facility 7C, a home 7D, and a shop 7E. Each of the vehicles 5A to 5E is an electrically driven vehicle equipped with a travel battery and may be, for example, a battery electric vehicle (BEV) or a plug-in hybrid electric vehicle (PHEV). The units such as the vehicles 5A to 5E and the factory 7A are configured to be connectable to charge-discharge devices 6A to 6H, respectively. When connected to the chargeable-dischargeable units such as the vehicles 5A to 5E, each of the charge-discharge devices 6A to 6H supplies electricity to the connected unit or receives electricity from the connected unit. Hereinafter, the vehicles 5A to 5E may also be referred to simply as the "vehicles", and the charge-discharge devices 6A to 6H may also be referred to simply as the "charge-discharge devices". Further, the devices and facilities such as the vehicles 5A to 5E and the factory 7A, each capable of performing an electricity transfer, may also be referred to simply as the "units". Note that the "units" may include the charge-discharge devices 6A to 6H.

Electricity from an electricity company 9 is supplied to various buildings such as the factory 7A, the company 7B, the commercial facility 7C, the home 7D, and the shop 7E through an electricity grid PL (grid-electricity network). The liberalization of electricity and the spread of the electricity generation technology based on renewable energy sources make it possible to introduce P2P (Peer to Peer) electricity transactions in which transactions of selling and buying electricity are conducted not only through the electricity company 9, but also directly between an individual or corporation having electricity resources and a different individual or corporation being a demander of electricity.

For example, the vehicles are able to charge or discharge a battery by being connected to the charge-discharge devices connected directly to the electricity grid PL or installed in various buildings such as the factory 7A. That is, by being connected to the charge-discharge devices, the vehicles are able to perform electricity transfers between them and the electricity company 9 directly through the electricity grid PL, or perform electricity transfers between them and various buildings such as the factory 7A. In this way, the electricity transfers using the mobile objects such as the vehicles can be performed by the P2P transactions.

In the electricity transaction system 1, the electricity demanders such as the vehicles, the factory 7A, and the home 7D access to a P2P electricity transaction market by communication with the server device 3 and place tenders to buy or sell electricity. For example, when an electricity demander wishes to buy or sell electricity, the electricity demander places a tender offering as tender conditions a time period in which the electricity demander wishes to buy or sell electricity, an amount of electricity per unit time period, a transaction price, and so forth, on an electricity transaction market where the electricity demander wishes to conduct an electricity transaction, via the server device 3. According to an arbitrary algorithm, an administrator of a P2P electricity transaction market executes a contract for an electricity transaction between a seller and a buyer with matching tender conditions and processes a tender with no condition matching counterpart as an uncontracted tender. Note that "tender" means an action of ordering an electricity transaction such as buying or selling, or such an order itself. On the other hand, "contract" means an action of determining to conduct an electricity transaction tendered, or such a determination itself.

Outline of P2P Electricity Transaction Market

Figure 2:
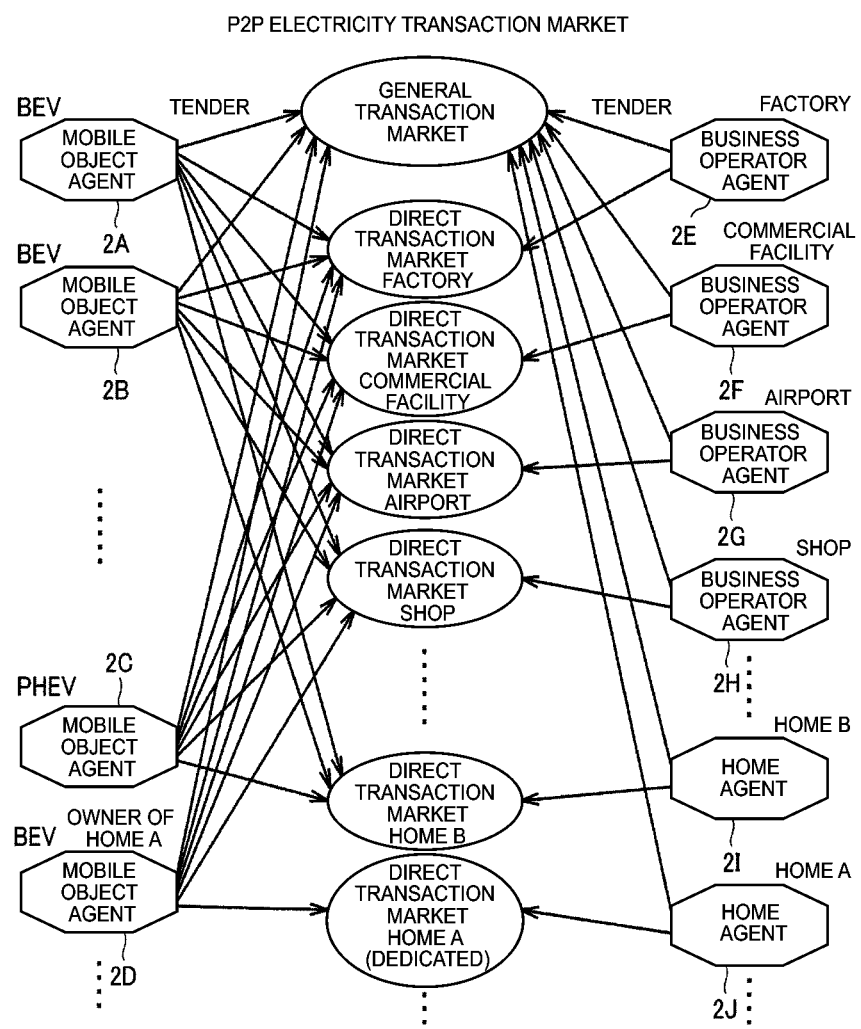
FIG. 2 is a diagram for describing an example of a P2P electricity transaction market to which the electricity transaction system according to the embodiment is applied.

FIG. 2 is a diagram for describing an example of a P2P electricity transaction market to which the electricity transaction system 1 according to the embodiment is applied. As illustrated in FIG. 2, the P2P electricity transaction market includes, for example, mobile object agents 2A to 2D, business operator agents 2E to 2H, and home agents 21, 2J. The mobile object agents 2A to 2D respectively manage tenders and contracts of mobile objects such as vehicles. The business operator agents 2E to 2H respectively manage tenders and contracts of large electricity demanders such as a factory, a commercial facility, an airport, and a shop, each with a relatively large electricity demand. The home agents 21, 2J respectively manage tenders and contracts of small electricity demanders such as homes, each with a relatively small electricity demand. Each of the vehicles, the large electricity demanders, and the small electricity demanders is configured to place a tender via the corresponding agent.

The P2P electricity transaction market includes a general transaction market and direct transaction markets (individual transaction markets). The general transaction market is a market where an unspecified large number of agents can participate in electricity transactions. On the general transaction market, an electricity transaction is contracted according to an arbitrary rule determined by an administrator of the P2P electricity transaction market. As a matching rule, there is a method of establishing a transaction on a first-come, first-served basis when a price offered by a seller and a price offered by a buyer match each other in a unit time period. As another matching rule, there is a method of establishing a transaction at an appropriate price after once sorting tenders (orders) of sellers and buyers placed in a unit time period.

Figure 3:
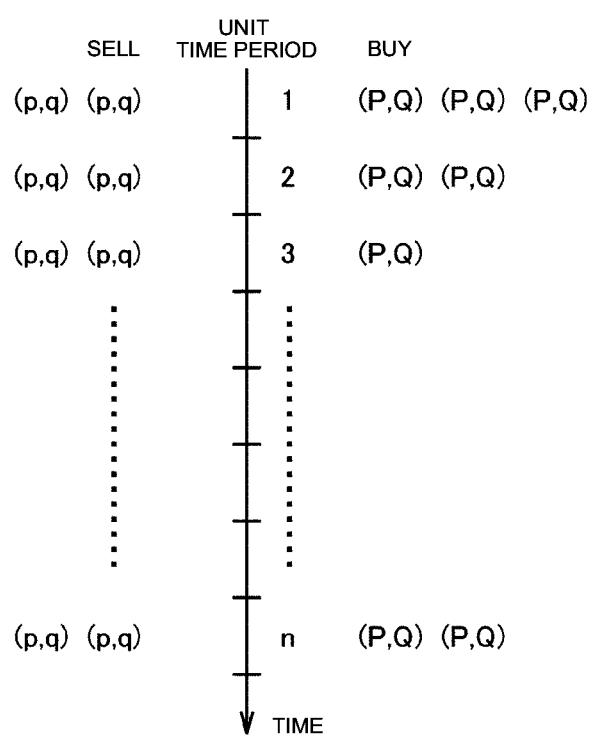
FIG. 3 is a diagram for describing an example of tendering on a general transaction market in a P2P electricity transaction.

FIG. 3 is a diagram for describing an example of tendering on a general transaction market in a P2P electricity transaction. As illustrated in FIG. 3, on the general transaction market, per unit time period (1, 2, . . . , n), an unspecified large number of sellers place tenders (p, q) that are pairs of a price and an amount of electricity, and an unspecified large number of buyers place tenders (P, Q) that are pairs of a price and an amount of electricity. The unit time period is a time width (e.g., 30 minutes) set on the general transaction market. A transaction of an amount of electricity is conducted per amount of electricity transmitted in the unit time period (electricity×length of unit time period).

The direct transaction market is a market where only an agent having an identification (ID) of the direct transaction market can participate in an electricity transaction. As illustrated in FIG. 2, in the direct transaction market, one market is formed for a fixed electricity demander where a charge-discharge device is installed. Server devices respectively managed by electricity demanders may form one direct transaction market, or one server device may form a plurality of direct transaction markets. On each of direct transaction markets, an electricity transaction is contracted according to an arbitrary rule uniquely determined by an administrator of the market. For example, as described above, as a matching rule, there is a method of establishing a transaction on a first-come, first-served basis when a price offered by a seller and a price offered by a buyer match each other in a unit time period, or a method of establishing a transaction at an appropriate price after once sorting tenders (orders) of sellers and buyers placed in a unit time period.

Figure 4:
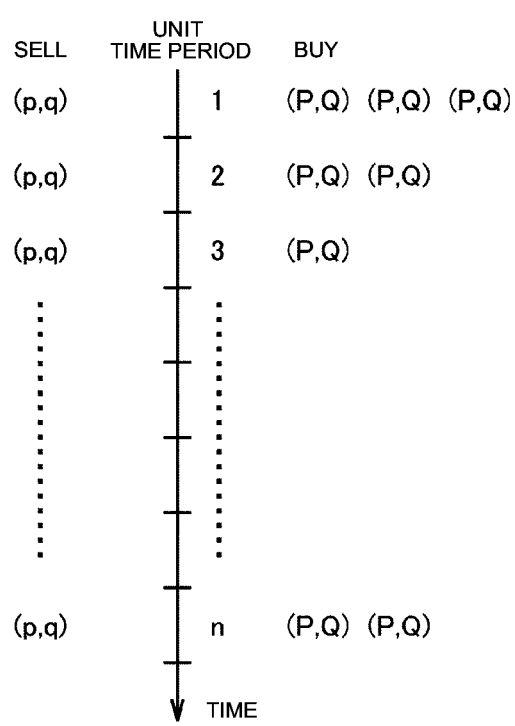
FIG. 4 is a diagram for describing an example of tendering on a direct transaction market in a P2P electricity transaction.

FIG. 4 is a diagram for describing an example of tendering on a direct transaction market in a P2P electricity transaction. As illustrated in FIG. 4, on the direct transaction market, per unit time period (1, 2, . . . , n), a seller offers a tender (p, q) that is a pair of a price and an amount of electricity, and, on this offer, a plurality of buyers having an ID of the direct transaction market place tenders (P, Q) that are pairs of a price and an amount of electricity. The unit time period is a time width (e.g., 30 minutes) individually set on the direct transaction market. A transaction of an amount of electricity is conducted per amount of electricity transmitted in the unit time period (electricity×length of unit time period).

Example of Charging Vehicle in Parking Lot

Figure 5:
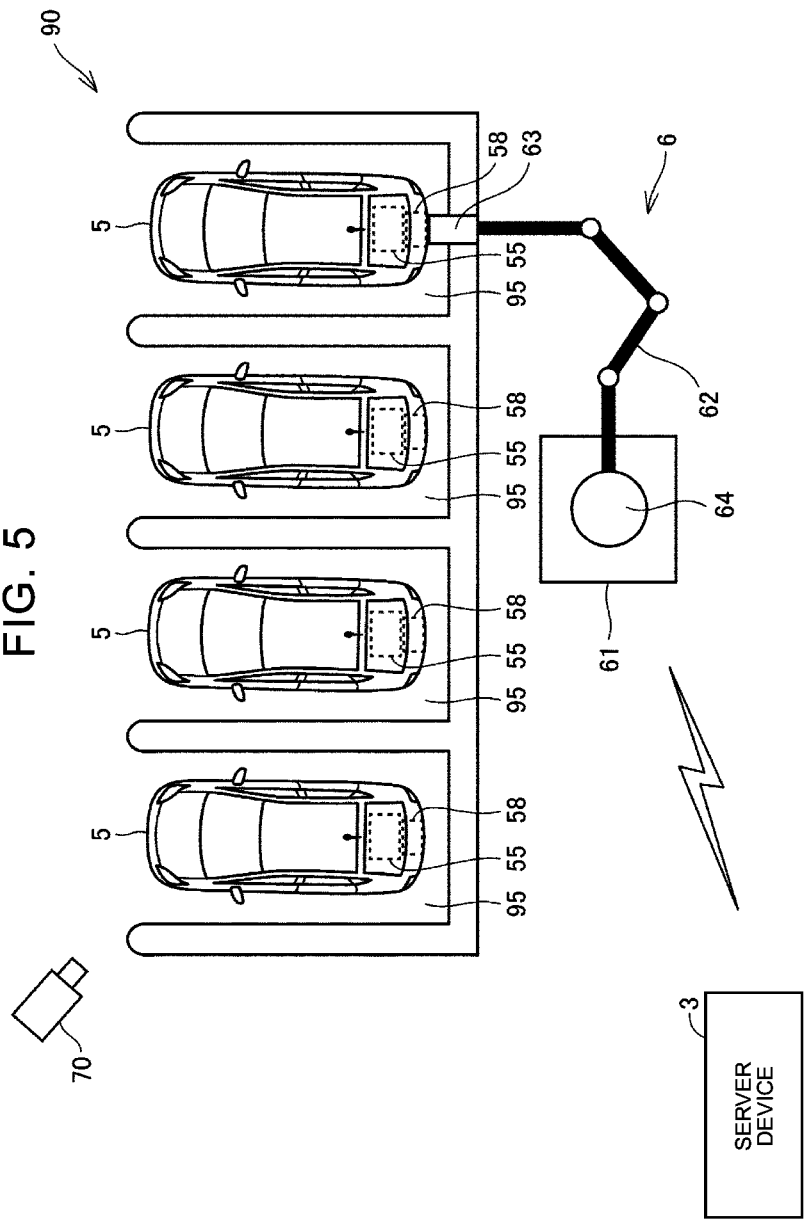
FIG. 5 is a diagram for describing an example of charging a vehicle using a charger in a parking lot.

FIG. 5 is a diagram for describing an example of charging a vehicle 5 using a charger 6 in a parking lot 90. As illustrated in FIG. 5, there are cases where a plurality of vehicles 5 is located in the parking lot 90. For example, the vehicles 5 are respectively parked in a plurality of parking spaces 95 provided in the parking lot 90. The single charger 6 is installed for the parking spaces 95.

The vehicle 5 includes a battery 55 that stores electricity, and a charging port 58 to which a charging connector 63 of the charger 6 can be connected. The vehicle 5 can be applied to the vehicles 5A to 5E illustrated in FIG. 1.

The charger 6 includes a charger body 61 having an electricity supply port 64, a charging arm 62 connected to the charger body 61, and the charging connector 63 provided at a distal end of the charging arm 62. The charger body 61 is fixedly installed in the parking lot 90 so as to correspond to the parking spaces 95. The charger 6 moves the charging connector 63 toward one of the vehicles 5 located in the parking lot 90, by operating the charging arm 62 under the control by the server device 3. By connecting the charging connector 63 to the charging port 58 of the vehicle 5, the charger 6 is able to supply electricity from the charger body 61 to the battery 55 of the vehicle 5. The charger 6 can be applied to the charge-discharge devices 6A to 6H illustrated in FIG. 1.

The server device 3 is able to confirm the position of the charger 6 or the position of the charging connector 63 using a monitoring device 70 such as a camera provided in the parking lot 90. Then, by operating the charging arm 62 of the charger 6, the server device 3 is able to move the charging connector 63 toward the vehicle 5 parked in the parking space 95.

In this way, the server device 3 is able to charge the vehicle 5 located in the parking lot 90 by using the charger 6. However, like the example of FIG. 5, when the vehicles 5 located in the parking lot 90 respectively wish charging by the charger 6, there are cases where the inequality occurs between the vehicle 5 determined to be a charging object and the vehicle 5 not determined to be a charging object.

For example, when the server device 3 determines the vehicle 5 to be charged by the charger 6 based on the order of parking in the parking spaces 95 (the order of arrival), the inequality occurs between the vehicle 5 determined to be a charging object and the vehicle 5 not determined to be a charging object. Alternatively, when the server device 3 randomly selects the vehicle 5 from the vehicles 5 parked in the parking spaces 95 and performs charging by the charger 6 for only the selected vehicle 5, the inequality occurs between the vehicle 5 selected by the server device 3 and the vehicle 5 not selected by the server device 3.

Therefore, the electricity transaction system 1 according to the embodiment is configured to perform an electricity transfer using the charger 6 in the parking lot 90 without causing the inequality between the vehicles 5. Hereinafter, the electricity transaction system 1 according to the embodiment will be specifically described.

Configuration of Electricity Transaction System

Figure 6:
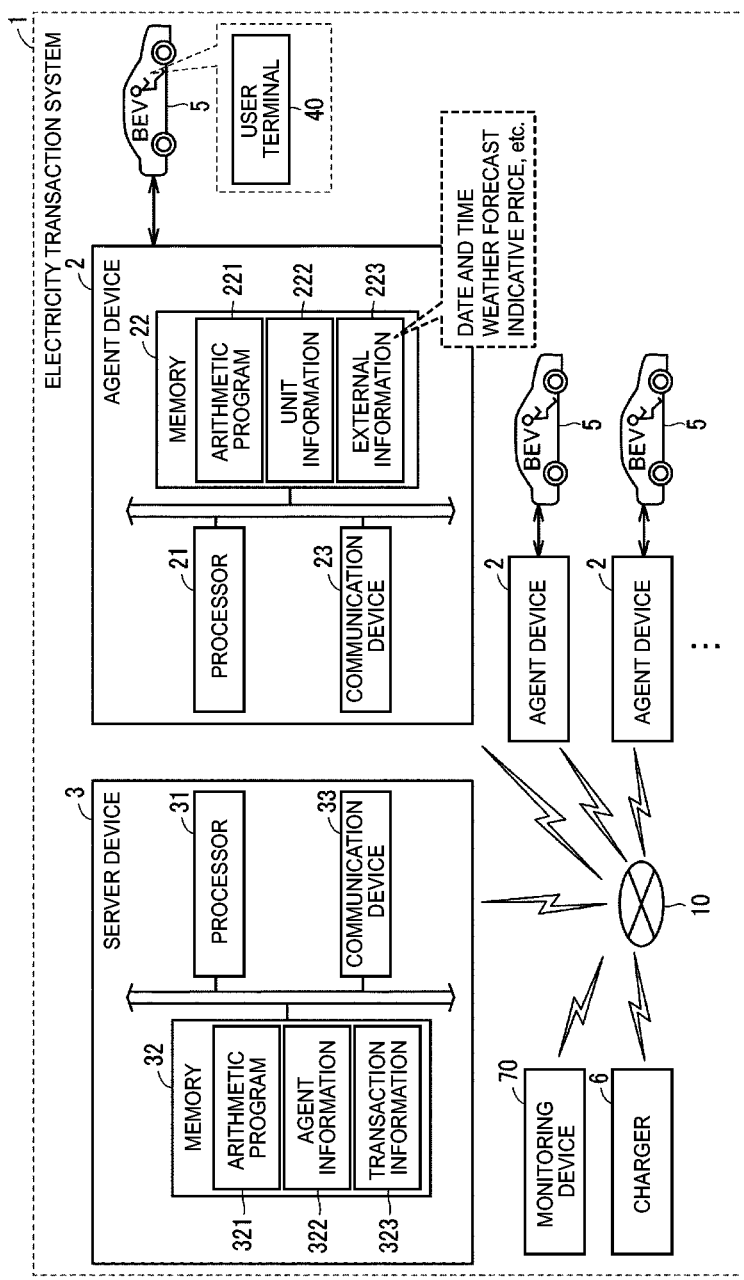
FIG. 6 is a diagram for describing an example of the configuration of the electricity transaction system according to the embodiment.

FIG. 6 is a diagram for describing an example of the configuration of the electricity transaction system 1 according to the embodiment. As illustrated in FIG. 6, the electricity transaction system 1 includes a plurality of vehicles 5 each capable of performing an electricity transfer, a plurality of agent devices 2 respectively corresponding to the vehicles 5, and the server device 3.

The agent devices 2 are respectively connected to the vehicles 5 and configured to place tenders for electricity transactions of the connected vehicles 5 to the server device 3. The agent device 2 includes a processor 21, a memory 22, and a communication device 23.

The processor 21 is an arithmetic processor (computer) that performs various processes by executing various programs. For example, the processor 21 is formed by a central processing unit (CPU), a field-programmable gate array (FPGA), a graphics processing unit (GPU), and so forth. Alternatively, the processor 21 may be formed by a processing circuitry.

The memory 22 stores programs and data for the processor 21 to perform various processes. For example, the memory 22 is formed by storage media such as a read only memory (ROM) and a random access memory (RAM). The memory 22 stores an arithmetic program 221, unit information 222, and external information 223.

The arithmetic program 221 includes source code for identifying a process to be performed by the processor 21. For example, the arithmetic program 221 includes source code for performing processes illustrated in FIG. 10, which will be described later. Specifically, the arithmetic program 221 includes source code for placing a tender for an electricity transaction of the vehicle 5 connected to the agent device 2, to the server device 3.

The unit information 222 includes information on the vehicle 5 connected to the agent device 2, particularly information on a tender and a contract for an electricity transaction.

FIG. 7 is a diagram for describing an example of the unit information 222 stored in the agent device 2. For example, the agent device 2 stores the unit information 222 in a table format as illustrated in FIG. 7. As illustrated in FIG. 7, the unit information table includes ID, form information, trip information, state-of-charge (SOC) information, connection information, tender information, and contract information.

ID includes identification information for identifying a unit (in this example, the vehicle 5 being a mobile object). The form information includes information on the form of a unit, and, for example, includes information for identifying a mobile object (vehicle), a business operator, a home, or the like. The trip information includes information on a travel history such as past travel route and travel time. The SOC information includes information on the amount of electricity currently stored in the battery 55. The connection information includes information for identifying whether or not a unit is currently connected to a charger 6. The tender information includes information on a past tender history and information on a currently placed tender. The contract information includes information on a past contract history, information for identifying whether or not a currently placed tender is contracted, and information on a contracted electricity transaction.

Referring back to FIG. 6, the external information 223 includes information on current date and time, information on weather forecast, information on an indicative price of electricity in an electricity transaction market, and so forth. The agent device 2 acquires the external information 223 from an external device such as the server device 3 through the network 10. In particular, since an indicative price is managed and determined by the server device 3, the agent device 2 acquires the indicative price from the server device 3.

The communication device 23 transmits and receives data to and from another agent device 2, the server device 3, and a user terminal 40 owned by a user of the vehicle 5 via wired or wireless communication through the network 10. The user terminal 40 may be, for example, a personal computer (PC), a navigation system installed in the vehicle 5, or a mobile terminal such as a smartphone.

The server device 3 is a device that, for example, manages an electricity transaction on a general transaction market or a direct transaction market of P2P electricity transaction, and performs a process for electricity transaction. The server device 3 includes a processor 31, a memory 32, and a communication device 33.

The processor 31 is an arithmetic processor (computer) that performs various processes by executing various programs. For example, the processor 31 is formed by a CPU, an FPGA, a GPU, and so forth. Alternatively, the processor 31 may be formed by a processing circuitry.

The memory 32 stores programs and data for the processor 31 to perform various processes. For example, the memory 32 is formed by storage media such as a ROM and a RAM. The memory 32 stores an arithmetic program 321, agent information 322, and transaction information 323.

The arithmetic program 321 includes source code for identifying a process to be performed by the processor 31. For example, the arithmetic program 321 includes source code for performing processes illustrated in FIGS. 10 and 11, which will be described later.

The agent information 322 includes information on the agent devices 2 participating in an electricity transaction market managed by the server device 3, particularly information on tenders and contracts for electricity transactions.

FIG. 8 is a diagram for describing an example of the agent information 322 stored in the server device 3. For example, the server device 3 stores the agent information 322 in a table format as illustrated in FIG. 8. As illustrated in FIG. 8, the agent information table includes ID, form information, tender information, contract information, and evaluation information.

ID includes identification information for identifying units respectively connected to the agent devices 2. The form information includes information on the form of a unit, and, for example, includes information for identifying a mobile object (vehicle). The tender information includes information on a past tender history and information on a currently placed tender in each of the agent devices 2. The contract information includes information on a past contract history and information for identifying whether or not a currently placed tender is contracted, in each of the agent devices 2. The evaluation information includes information on an evaluation result of a past electricity transaction in each of the agent devices 2. For example, when the agent device 2 properly placed a tender and executed a contract in a past electricity transaction, the server device 3 adds an evaluation point, and when the agent device 2 canceled an electricity transfer although the agent device 2 placed a tender in a past electricity transaction, the server device 3 subtracts an evaluation point. Evaluation points calculated in this way are stored as evaluation information in the agent information table.

The transaction information 323 includes information on electricity transactions for the vehicles 5 respectively corresponding to the agent devices 2 participating in an electricity transaction market managed by the server device 3.

FIG. 9 is a diagram for describing an example of the transaction information 323 stored in the server device 3. For example, the server device 3 stores the transaction information 323 in a table format as illustrated in FIG. 9. As illustrated in FIG. 9, the transaction information table includes information for identifying a scheduled time of charge, information for identifying a charger 6 that performs charging, information for identifying a parking space 95 in a parking lot 90, and information for identifying a demand-side unit.

For example, in the example of FIG. 9, a charger A is installed for a plurality of parking spaces A1 to A4, and a charger B is installed for a plurality of parking spaces B1 to B4. In the transaction information table, information for identifying the charger 6 that supplies electricity to the vehicle 5, the parking space 95 where charging is performed, and the vehicle 5 that is charged using electricity from the charger 6 is stored per scheduled time of charge.

Referring back to FIG. 6, the communication device 33 transmits and receives data to and from the agent devices 2, the vehicles 5, the user terminals 40, and the chargers 6 via wired or wireless communication through the network 10.

In the electricity transaction system 1 configured as described above, the agent device 2 places a tender for an electricity transaction to the server device 3 of the electricity transaction market based on the trip information, the SOC information, the connection information, and so forth included in the unit information 222.

For example, the agent device 2 estimates a travel route of the vehicle 5 based on the trip information and calculates a shortage of an amount of electricity according to the current SOC with respect to an amount of electricity necessary for reaching a target point. That is, the agent device 2 calculates an amount of electricity that should be bought for reaching the target point in future travel. Then, for buying the calculated amount of electricity, the agent device 2 places a tender for an electricity transaction, offering a determined transaction price, to the server device 3 of the electricity transaction market. Tender information for the tender includes information such as a scheduled time of charge, a charging place, a transaction price of electricity, and an amount of electricity and is transmitted from the agent device 2 to the server device 3. Since such tenders are placed by the agent devices 2 respectively corresponding to a plurality of units, the amounts of electricity and the transaction prices differ between the respective units.

Further, the agent device 2 may place a tender for an electricity transaction to the server device 3 of the electricity transaction market based on the external information 223. For example, the agent device 2 may place a tender for an electricity transaction aiming at a unit time period in which the amount of electricity is least expensive, based on a date and time and an indicative price. Further, the agent device 2 may calculate, based on weather forecast, an amount of electricity that can be generated by the vehicle 5 by a travel scheduled time or an amount of electricity that can be generated by the vehicle 5 during travel, and subtract the calculated amount of electricity from the amount of electricity that should be bought for reaching the target point.

After accepting a tender for an electricity transaction from the agent device 2, the server device 3 contracts the electricity transaction corresponding to the tender when a contract condition is established. The contract condition includes that a price offered by a seller (e.g., the server device 3 side of the parking lot 90) and a price offered by a buyer (e.g., the vehicle 5 side) match each other, that the seller can supply an amount of electricity that the buyer wishes to buy, and so forth.

Then, when the vehicle 5 for which the tender for the electricity transaction was placed and the electricity transaction corresponding to the tender was contracted is parked in the parking space 95 being a charge scheduled place at the time when a scheduled time of charge has arrived, the server device 3 controls the charger 6 to charge the vehicle 5 using the charger 6.

On the other hand, the server device 3 does not perform charging using the charger 6 for the vehicle 5 for which a tender for an electricity transaction is not placed, or the vehicle 5 for which a tender for an electricity transaction was placed but not contracted.

Consequently, the server device 3 is able to perform charging using the charger 6 for only at least one vehicle 5 for which a tender for an electricity transaction was placed and the electricity transaction corresponding to the tender was contracted, out of the vehicles 5 located in the parking lot 90. This makes it possible to charge the vehicle 5 using the charger 6 in the parking lot 90 without causing the inequality between the vehicles 5.

When having contracted an electricity transaction, the server device 3 may transmit a contract result to the user terminal 40 owned by a user of the vehicle 5 for which the electricity transaction was contracted. The contract result includes information such as a scheduled time of charge, a charging place (e.g., location information of the parking space 95 where charging is performed), a contracted transaction price, and a contracted amount of electricity.

Consequently, the user of the vehicle 5 for which the electricity transaction was contracted is able to acquire the contract result using the user terminal 40. Further, by viewing the contract result using the user terminal 40, the user is able to move the vehicle 5 to the parking space 95 being the charge scheduled place by the charge scheduled time.

Process for Tendering and Contracting in Electricity Transaction System

FIG. 10 is a flowchart illustrating a processing procedure for tendering and contracting in the electricity transaction system 1. The flowchart of FIG. 10 is, for example, called from a main routine (not illustrated) upon establishment of a predetermined condition and executed periodically. Steps of the server device 3 are realized by the execution of the arithmetic program 321 by the processor 31. Steps of the agent device 2 are realized by the execution of the arithmetic program 221 by the processor 21. Further, steps of the user terminal 40 are realized by the execution of an arithmetic program (not illustrated) by a processor (not illustrated) of the user terminal 40. Hereinafter, "step" will be abbreviated as "S".

As illustrated in FIG. 10, the agent device 2 performs a tender process (S13). Specifically, the agent device 2 determines a scheduled time of charge, a charging place, a transaction price of electricity, and an amount of electricity based on the trip information, the SOC information, the connection information, and so forth included in the unit information 222 and transmits a tender signal including such determined tender information to the server device 3 managing the electricity transaction in the parking lot 90.

The server device 3 acquires the tender information by receiving the tender signal from the agent device 2 (S21). That is, the server device 3 accepts a tender for an electricity transaction in the parking lot 90 from the agent device 2.

Upon accepting the tender from the agent device 2, the server device 3 performs a contract process (S22). Specifically, when the contract condition described above is established, the server device 3 contracts the electricity transaction corresponding to the tender from the agent device 2.

Herein, when the vehicles 5 (the agent devices 2) having placed tenders for electricity transactions by the same charger 6 in the same electricity transaction time period exist, the server device 3 may determine the vehicle 5 for contract according to a predetermined rule.

For example, the server device 3 may determine the vehicle 5 for contract based on at least one of a transaction price, the order of tender, an amount of electricity, a charging time, a past evaluation result, and a distance from a charging place, as the predetermined rule.

Specifically, out of the vehicles 5 having placed tenders, the server device 3 may execute a contract for the vehicle 5 having placed a tender at the highest transaction price. Out of the vehicles 5 having placed tenders, the server device 3 may execute a contract for the vehicle 5 having placed a tender at the earliest tender timing. Out of the vehicles 5 having placed tenders, the server device 3 may execute a contract for the vehicle 5 having placed a tender for a transaction with the largest amount of electricity. Out of the vehicles 5 having placed tenders, the server device 3 may execute a contract for the vehicle 5 having placed a tender for a transaction with the longest charging time. Out of the vehicles 5 having placed tenders, the server device 3 may execute a contract for the vehicle 5 with the highest past evaluation result. The server device 3 may identify the evaluation result based on the evaluation information included in the agent information 322 of FIG. 8 stored in the memory 32. Out of the vehicles 5 having placed tenders, the server device 3 may execute a contract for the vehicle 5 at the shortest distance from a charging place. The server device 3 may determine the vehicle 5 for contract using only one of a plurality of kinds of rules described above or may determine the vehicle 5 for contract by combining the rules. That is, the server device 3 can determine the vehicle 5 for contract based on at least one of a plurality of kinds of rules described above.

Further, when tenders are accepted from the vehicles 5, the server device 3 may contract an electricity transaction corresponding to the tender by giving an incentive based on at least one of an amount of electricity and a charging time in an electricity transaction.

Figure 12:
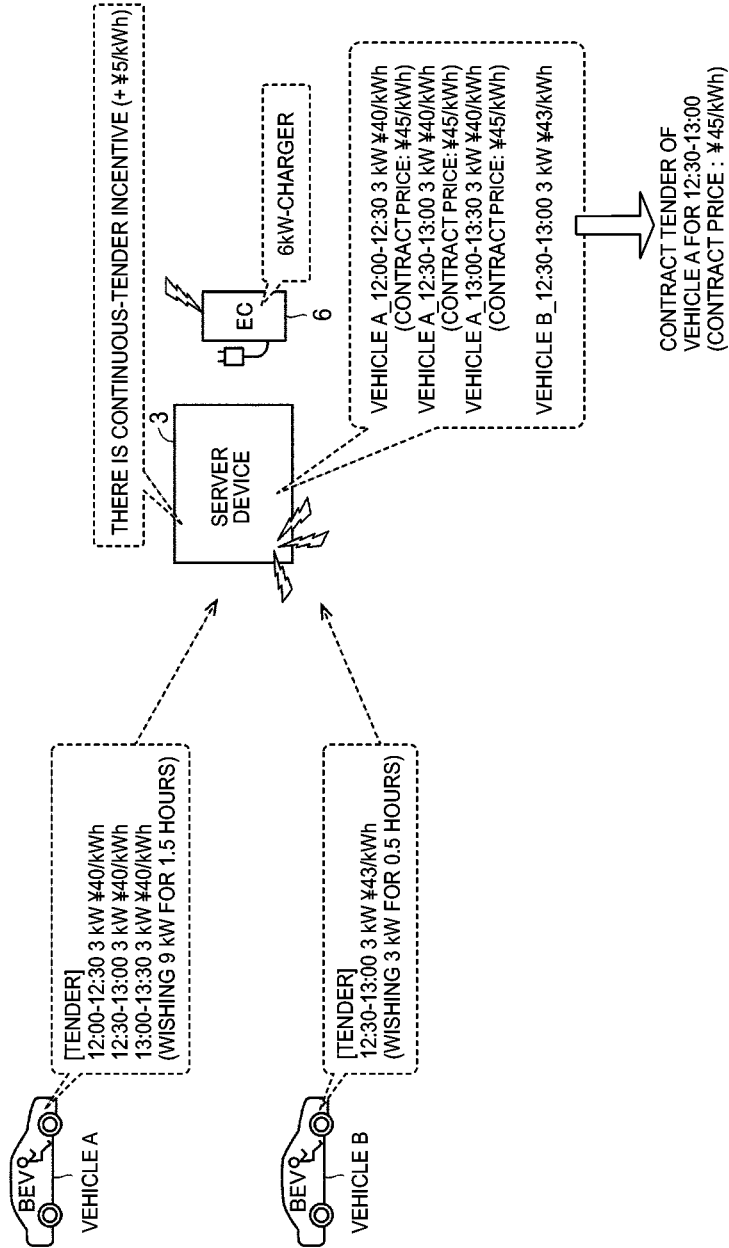
FIG. 12 is a diagram for describing an example of a contract process.

For example, FIG. 12 is a diagram for describing an example of the contract process. As illustrated in FIG. 12, the server device 3 has received a tender for 3 kW (¥40/kWh) from a vehicle A in each of a time frame from 12:00 to 12:30, a time frame from 12:30 to 13:00, and a time frame from 13:00 to 13:30. Further, the server device 3 has received a tender for 3 kW (¥43/kWh) from a vehicle B in a time frame from 12:30 to 13:00. That is, the server device 3 has accepted the tenders from the vehicles 5, i.e., the vehicle A and the vehicle B, in the time frame from 12:30 to 13:00.

As described above, out of the vehicles 5 having placed tenders, the server device 3 can execute a contract for the vehicle 5 having placed a tender at the highest transaction price. In this case, in the time frame from 12:30 to 13:00, the transaction price of electricity tendered from the vehicle A is 3 kW (¥40/kWh) and the transaction price of electricity tendered from the vehicle B is 3 kW (¥43/kWh), and therefore, the server device 3 executes a contract for the vehicle B. However, the total amount of electricity wished by the vehicle A (9 kW) is greater than the total amount of electricity wished by the vehicle B (3 kW). Further, the total charging time wished by the vehicle A (1.5 hours) is longer than the total charging time wished by the vehicle B (0.5 hours). Therefore, the server device 3 gives an incentive when, like the vehicle A, the amount of electricity tendered is greater than that of the other vehicle 5 or the charging time tendered is longer than that of the other vehicle 5.

For example, the server device 3 adds ¥5/kWh to a contract price of the vehicle A as an incentive for contract. Consequently, the server device 3 sets the contract price in each of the time frames to ¥45/kWh in the electricity transaction with the vehicle A. In this case, in the time frame from 12:30 to 13:00, the transaction price of the vehicle A (¥45/kWh) is higher than the transaction price of the vehicle B (¥43/kWh), and therefore, the server device 3 contracts the tender from the vehicle A in the time frame from 12:30 to 13:00.

In this way, even when tenders are placed from the vehicles 5, the server device 3 is able to properly execute a contract for the tender by contracting an electricity transaction corresponding to the tender by giving an incentive based on at least one of an amount of electricity and a charging time in an electricity transaction. Further, since the server device 3 is able to continue the operation of the charger 6 by giving precedence to a tender wishing charging in a continuous time frame, like the vehicle A, over the other tender, it is possible to reduce the electricity loss generated in the operation of the charger 6.

Referring back to FIG. 10, the server device 3 updates the transaction information 323 of FIG. 9 stored in the memory 32 based on the acquired tender information (S23). Thereafter, the server device 3 returns the processing to the main routine.

After performing the contract process, the server device 3 transmits a contract signal including a contract result about a contracted electricity transaction to the agent device 2. As described above, the contract result includes information such as a scheduled time of charge, a charging place (e.g., location information of the parking space 95 where charging is performed), a contracted transaction price, and a contracted amount of electricity.

Upon acquiring the contract result by receiving the contract signal, the agent device 2 updates the contract information included in the unit information 222 of FIG. 7 stored in the memory 22 (S12). Thereafter, the agent device 2 returns the processing to the main routine.

The agent device 2 transmits a contract result signal including the contract result to the user terminal 40. The user terminal 40 acquires the contract result by receiving the contract result signal (S31). The user terminal 40 notifies the acquired contract result to a user (S32). For example, when the user terminal 40 is a navigation system installed in the vehicle 5, the contract result is displayed on a navigation screen of the navigation system. Alternatively, when the user terminal 40 is a mobile terminal such as a smartphone, the contract result is displayed on a screen of the mobile terminal. Thereafter, the user terminal 40 returns the processing to the main routine.

Process for Electricity Supply in Electricity Transaction System

Figure 11:
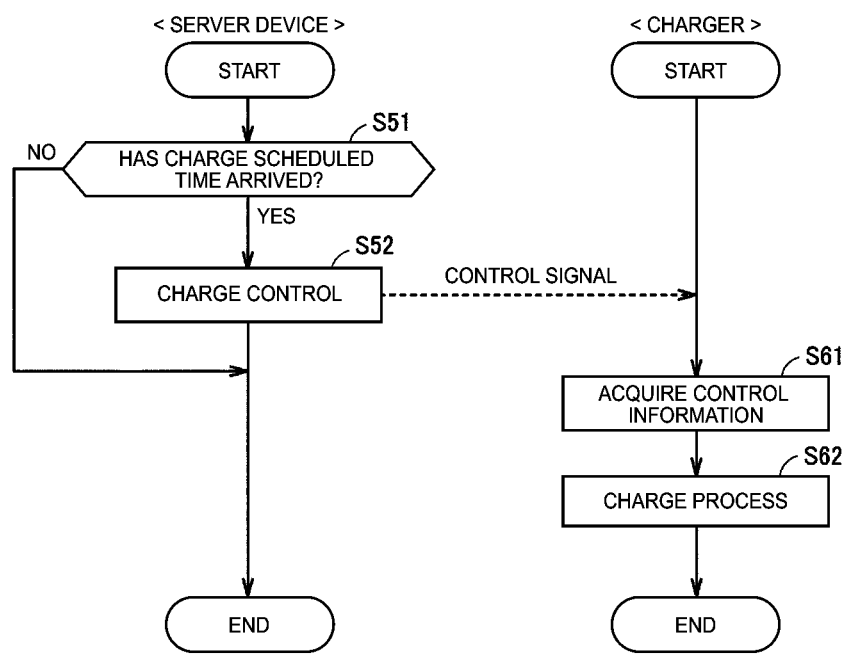
FIG. 11 is a flowchart illustrating a processing procedure for electricity supply in the electricity transaction system.

FIG. 11 is a flowchart illustrating a processing procedure for electricity supply in the electricity transaction system 1. The flowchart of FIG. 11 is, for example, called from a main routine (not illustrated) upon establishment of a predetermined condition and executed periodically. Steps of the server device 3 are realized by the execution of the arithmetic program 321 by the processor 31. Steps of the charger 6 are realized by the execution of an arithmetic program (not illustrated) by a processor (not illustrated) of the charger 6. Hereinafter, "step" will be abbreviated as "S".

As illustrated in FIG. 11, the server device 3 determines whether or not a scheduled time of charge has arrived (S51). When the scheduled time of charge has not arrived (NO at S51), the server device 3 returns the processing to the main routine.

On the other hand, when the scheduled time of charge has arrived (YES at S51), the server device 3 performs charge control for charging the vehicle 5 having placed a tender (S52). Specifically, the server device 3 transmits a control signal including control information for charging the vehicle 5 to the charger 6. The control information includes a scheduled time of charge, a charging place, an amount of electricity, information for controlling the respective configurations such as the charging arm 62, and so forth. Thereafter, the server device 3 returns the processing to the main routine.

The charger 6 acquires the control information by receiving the control signal (S61). The charger 6 performs a charge process according to the acquired control information (S62). For example, the charger 6 operates the charging arm 62 according to the control information, thereby connecting the charging connector 63 to the charging port 58 of the vehicle 5 parked in the charging place. That is, under the direct control of the operation of the charger 6 by the server device 3, the charger 6 is able to supply electricity to the battery 55 of the vehicle 5 to charge the battery 55. Thereafter, the charger 6 returns the processing to the main routine.

When a plurality of tenders is placed in one time period in one parking lot 90, the server device 3 may contract an electricity transaction corresponding to only one of the tenders or may contract electricity transactions respectively corresponding to the tenders.

As described above, with the electricity transaction system 1 according to this embodiment, the server device 3 is able to charge at least one vehicle 5 for which a tender for an electricity transaction was placed and the electricity transaction corresponding to the tender was contracted, out of the vehicles 5 located in the parking lot 90. This makes it possible for the server device 3 to perform charging using the charger 6 in the parking lot 90 without causing the inequality between the vehicles 5.

Further, by accepting a tender for an electricity transaction from the vehicle 5 per time period and contracting the tender per time period, the server device 3 is able to perform charging using the charger 6 for only the vehicle 5 contracted per time period. Consequently, it is possible to smoothly handle charging of the vehicle 5 in the parking lot 90.

By transmitting a control signal, the server device 3 is able to perform charging by the charger 6 using the charging arm 62 for at least one vehicle 5 for which an electricity transaction was contracted.

The server device 3 transmits a contract result upon contracting an electricity transaction to the user terminal 40 owned by a user of at least one vehicle 5. Consequently, the user of the vehicle 5 for which the electricity transaction was contracted is able to acquire the contract result using the user terminal 40, and therefore, the convenience of the user is improved.

Modifications

The present disclosure is not limited to the embodiment described above, and various modifications and applications are made possible. Hereinafter, modifications applicable to the present disclosure will be described.

In the embodiment described above, the charger 6 is configured such that the charger body 61 having the electricity supply port 64 is fixedly installed in the parking lot 90 and that the charging arm 62 is moved toward the vehicle 5 being the charging object. However, the charger 6 may be configured such that the charger body 61 having the electricity supply port 64 is movable along with the charging arm 62. Further, the charger 6 may be configured such that, by operating the charger body 61 along with the charging arm 62 according to control information from the server device 3, the charging connector 63 is connected to the charging port 58 of the vehicle 5 parked in a charging place.

Note that, not limited to the direct control of the operation of the charger 6 by the server device 3, a processor installed in the charger 6 may operate the charging arm 62 and so forth according to control information from the server device 3. That is, "charge control" of the server device 3 at S52 is not limited to charging the vehicle 5 by the direct control of the charger 6 by the server device 3. Alternatively, "charge control" of the server device 3 at S52 may be transmission of information (a scheduled time of charge, a charging place, an amount of electricity, etc.) for allowing the charger 6 to operate by itself to charge the vehicle 5.

In the embodiment described above, the server device 3 charges the vehicle 5 by operating the charger 6 including the charging arm 62, but the server device 3 may charge the vehicle 5 by controlling another device.

Figure 13:
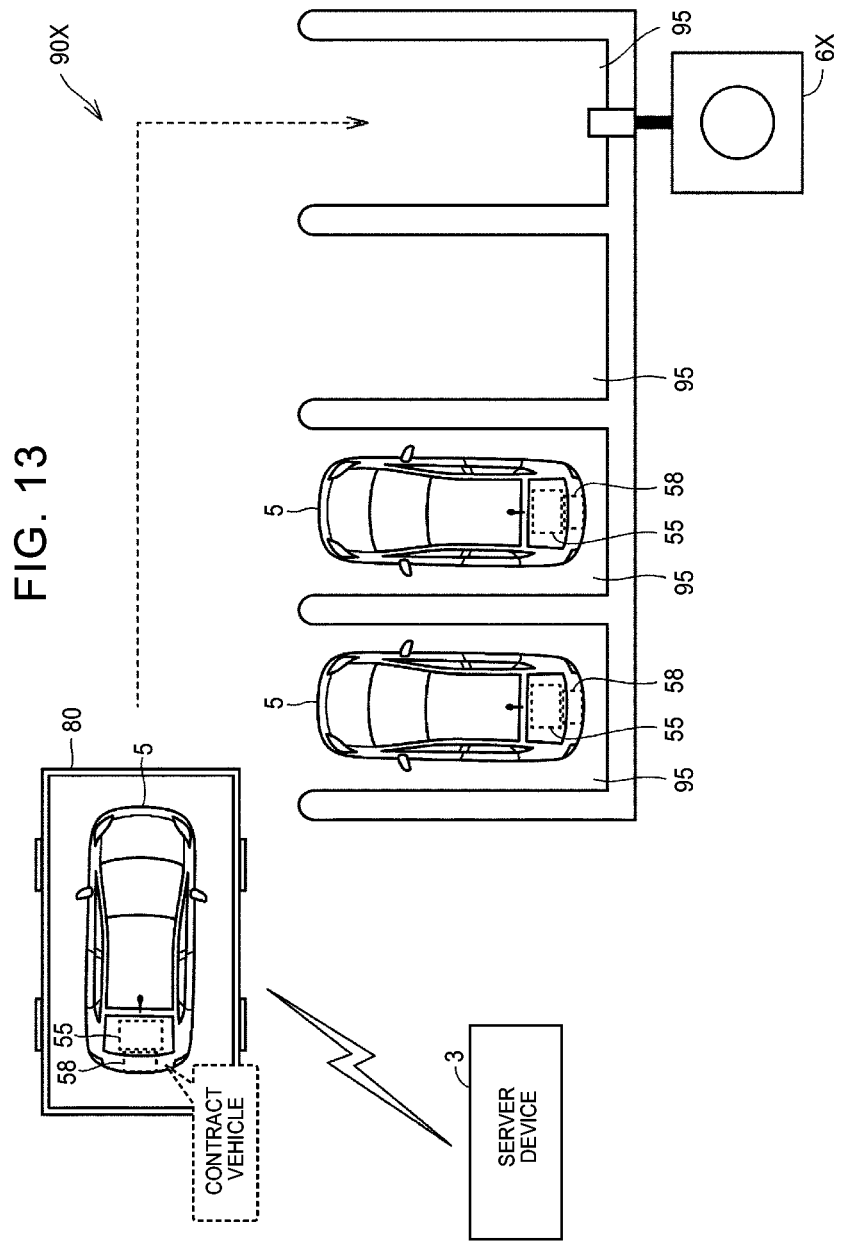
FIG. 13 is a diagram for describing an example of charging a vehicle using a charger in a parking lot according to a modification.

For example, FIG. 13 is a diagram for describing an example of charging the vehicle 5 using a charger 6X in a parking lot 90X according to a modification. As illustrated in FIG. 13, in the parking lot 90X, the charger 6X is fixedly installed at at least one of a plurality of parking spaces 95. The charger 6X is the same as the charger 6 in that the charger 6X includes configurations such as a charging arm 62 and a charging connector 63, but differs from the charger 6 in that the charger 6X is fixedly installed at the parking space 95. The vehicle 5 is transported to the parking space 95 where the charger 6X is installed, by a transport device 80.

In the parking lot 90X described above, the server device 3 transmits a control signal including control information for performing charging between the vehicle 5 and the charger 6X, to the transport device 80. The transport device 80 operates according to charge control from the server device 3 and transports at least one vehicle 5 contracted toward the parking space 95 where the charger 6X is installed. Consequently, by the use of the transport device 80, the server device 3 is able to charge the vehicle 5 contracted using the charger 6X.

Note that, not limited to the direct control of the operation of the transport device 80 by the server device 3, the transport device 80 may operate by itself according to the control information from the server device 3. That is, "charge control" of the server device 3 at S52 is not limited to charging the vehicle 5 by the direct control of the transport device 80 by the server device 3. Alternatively, "charge control" of the server device 3 at S52 may be transmission of information (a scheduled time of charge, a charging place, an amount of electricity, etc.) for allowing the transport device 80 to operate by itself to transport the vehicle 5 to the location of the charger 6X.

Figure 14:
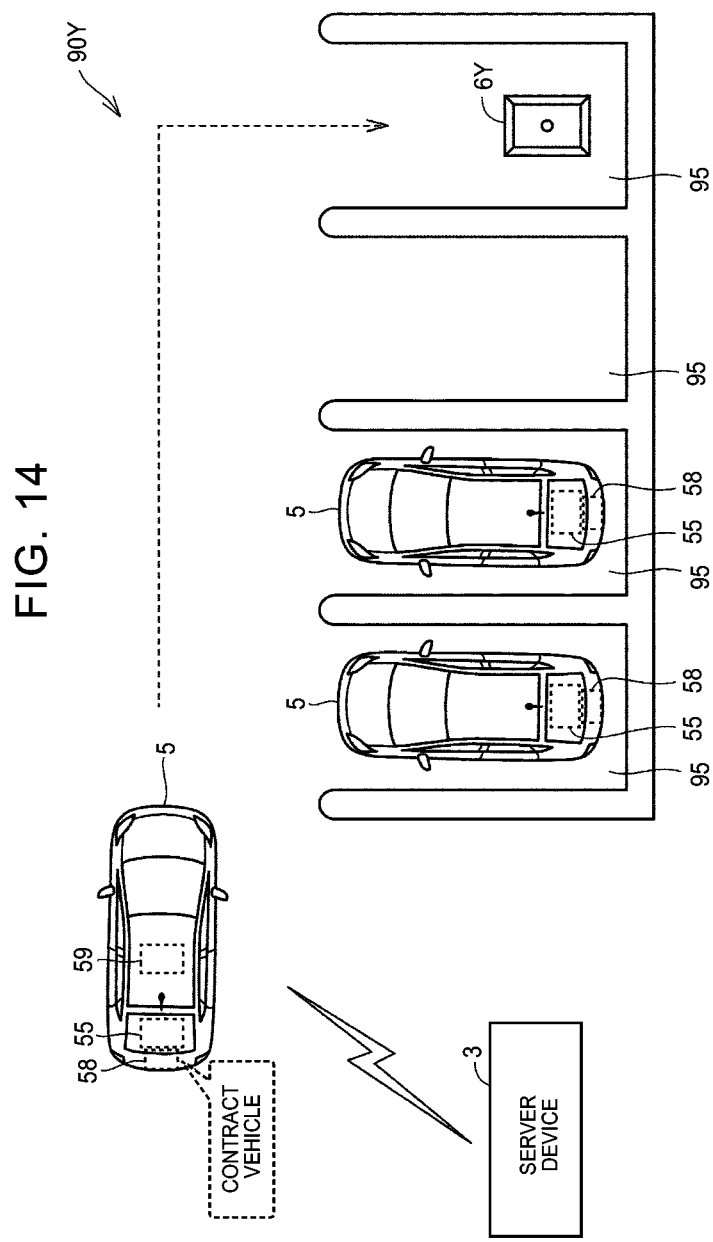
FIG. 14 is a diagram for describing an example of charging a vehicle using a charger in a parking lot according to a modification.

For example, FIG. 14 is a diagram for describing an example of charging the vehicle 5 using a charger 6Y in a parking lot 90Y according to a modification. As illustrated in FIG. 14, in the parking lot 90Y, the charger 6Y is fixedly installed in at least one of a plurality of parking spaces 95. The charger 6Y is configured such that, for example, an electricity transmission coil is buried in the ground of the parking space 95 to allow transmission of electricity to the vehicle 5 in a non-contact manner. The vehicle 5 includes an electronic control unit (ECU) 59 and is capable of self-driving under the control by the ECU 59.

In the parking lot 90Y described above, the server device 3 transmits, to the vehicle 5, a control signal including control information for performing charging between the vehicle 5 and the charger 6Y. The vehicle 5 operates according to charge control from the server device 3 and moves toward the parking space 95 where the charger 6Y is installed. Consequently, the server device 3 is able to move the vehicle 5 contracted by self-driving toward the parking space 95 where the charger 6Y is installed, thereby charging the vehicle 5 contracted using the charger 6Y.

Note that, not limited to the direct control of the operation of the vehicle 5 by the server device 3, the vehicle 5 may operate by itself according to the control information from the server device 3. That is, "charge control" of the server device 3 at S52 is not limited to moving the vehicle 5 to the location of the charger 6Y by the direct control of the vehicle 5 by the server device 3. Alternatively, "charge control" of the server device 3 at S52 may be transmission of information (a scheduled time of charge, a charging place, an amount of electricity, etc.) for allowing the vehicle 5 to operate by itself to move the vehicle 5 to the location of the charger 6Y.

The vehicle 5 may display information such as a charging place on a navigation screen of a navigation system according to the control information from the server device 3. In this case, by driving the vehicle 5 while viewing the navigation screen, a user may move the vehicle 5 toward the parking space 95 where the charger 6Y is installed.

In the example of FIG. 13, the charger 6X may be the charger 6Y of the non-contact type as in the example of FIG. 14. In the example of FIG. 14, as in the example of FIG. 13, the charger 6Y may be the charger 6X including the configurations such as the charging arm 62 and the charging connector 63.

When the number of the vehicles 5 wishing (e.g., reserving) electricity transactions is greater than the number of the chargers 6 in the parking lot 90, the processor 31 of the server device 3 may accept a tender for charging using the charger 6. That is, when the number of the vehicles 5 wishing electricity transactions is smaller than the number of the chargers 6 in the parking lot 90, the server device 3 may charge all the vehicles 5 wishing the electricity transactions using the chargers 6, and when the number of the vehicles 5 wishing electricity transactions is greater than the number of the chargers 6 in the parking lot 90, the server device 3 may charge, using the charger 6, at least one vehicle 5 for which a tender for an electricity transaction was placed and the electricity transaction corresponding to the tender was contracted.

With this configuration, the server device 3 is able to determine whether or not to perform charging with a tender and a contract according to the number of the vehicles 5 wishing electricity transactions and the number of the chargers 6, and therefore, it is possible to smoothly handle charging in the parking lot 90 depending on the situation.

The monitoring device 70 is not limited to a camera and may include sensors that detect opening and closing of gates provided at the entrance and exit of the parking lot 90. That is, the server device 3 may compare the number of the vehicles 5 wishing electricity transactions and the number of the chargers 6 by grasping the number of the vehicles 5 in the parking lot 90 based on a detection signal of the monitoring device 70.

The processor 31 of the server device 3 may accept a reservation for the parking lot 90 along with a tender for an electricity transaction. With this configuration, the server device 3 allows a user of the vehicle 5 to make a reservation (tender) for getting the parking space 95 and charging the vehicle 5 using the charger 6 in the parking space 95 at the same time.

In the case where a tender for charging in a first parking space in a first time period was contracted for a first vehicle, where a tender for charging in a second parking space in a second time period subsequent to the first time period was contracted for the first vehicle, and where a tender for charging in the first parking space in the second time period was contracted for a second vehicle, the processor 31 of the server device 3 may exchange the parking spaces being charging places between the first vehicle and the second vehicle in the second time period. That is, the server device 3 may contract, for a first vehicle, a tender for charging in a first parking space in a first time period, contract, for the first vehicle, a tender for charging in the first parking space in a second time period subsequent to the first time period, and contract, for a second vehicle, a tender for charging in a second parking space in the second time period. With this configuration, the server device 3 is able to charge the first vehicle in the same charging place continuously from the first time period to the second time period without changing the charging place per time period for the first vehicle.

The parking lot 90 is not limited to a large parking lot such as a commercial facility or a park and may be a parking lot owned by an individual such as a home.

In the embodiment described above, the agent device 2 places a tender for an electricity transaction to the server device 3 regardless of an intention of a user of the vehicle 5. However, the user itself may place a tender for an electricity transaction to the server device 3. For example, the agent device 2 may be a user terminal that allows the user to perform an operation for a tender. The user terminal may be, for example, a personal computer (PC), a navigation system installed in a vehicle, or a mobile terminal such as a smartphone.

The embodiment disclosed herein should be construed to be illustrative and not limitative in all aspects. The scope of the present disclosure is defined by the scope of the claims rather than the description of the embodiment described above and is intended to include all modifications within the scope of the claims and within the meaning and scope of equivalents of the claims.

What is claimed is:

1. A server device configured to conduct a transaction of electricity transfer using a charger in a parking lot, the server device comprising:
a processor; and
a memory storing a program executed by the processor, wherein the processor is configured to:
accept a tender for the transaction of electricity transfer in the parking lot;
contract the transaction of electricity transfer corresponding to the tender; and
perform charge control for charging at least one vehicle for which the tender has been placed, out of a plurality of vehicles located in the parking lot, wherein
during a first time period, the transaction of electricity transfer is agreed upon for a first vehicle among the plurality of vehicles, wherein the first vehicle is in a first parking space of the parking lot, and
during a second time period following the first time period, the transaction of electricity transfer is agreed upon for the first vehicle in a second parking space of the parking lot, and a second vehicle among the plurality of vehicles that has agreed to the transaction of electricity transfer in the first parking space during the second time period exchanges parking spaces with the first vehicle such that the electricity transfer to the first vehicle will take place during the second time period in the first parking space and the electricity transfer to the second vehicle will take place during the second time period in the second parking space.

2. The server device according to claim 1, wherein:
the charger includes a charging arm having a charging connector configured to be used for charging; and
the processor is configured to connect the charging connector to a charging port of the at least one vehicle by operating the charging arm according to the charge control.

3. The server device according to claim 1, wherein:
the parking lot includes a transport device configured to transport each of the vehicles toward the charger; and
the processor is configured to transport the at least one vehicle toward the charger by operating the transport device according to the charge control.

4. The server device according to claim 1, wherein the at least one vehicle is configured to operate according to the charge control to move toward the charger.

5. The server device according to claim 1, wherein the processor is configured to transmit a contract result upon contracting the transaction of electricity transfer to a user terminal owned by a user of the at least one vehicle.

6. The server device according to claim 1, wherein when the number of the vehicles wishing the transactions of electricity transfer is greater than the number of the chargers, the processor is configured to accept the tender from the at least one vehicle out of the vehicles.

7. The server device according to claim 1, wherein the processor is configured to accept a reservation for the parking lot along with the tender.

8. The server device according to claim 1, wherein when the tenders are accepted from the vehicles, the processor is configured to contract the transaction of electricity transfer corresponding to the tender by giving an incentive based on at least one of an amount of electricity and a charging time in the transaction of electricity transfer.

9. An electricity transaction system configured to conduct a transaction of electricity transfer using a charger in a parking lot, the electricity transaction system comprising:
the charger; and
a server device,
wherein the server device is configured to:
accept a tender for the transaction of electricity transfer in the parking lot;
contract the transaction of electricity transfer corresponding to the tender; and
perform charge control for charging at least one vehicle out of a plurality of vehicles located in the parking lot, the at least one vehicle having placed the tender, wherein
during a first time period, the transaction of electricity transfer is agreed upon for a first vehicle among the plurality of vehicles, wherein the first vehicle is in a first parking space of the parking lot, and
during a second time period following the first time period, the transaction of electricity transfer is agreed upon for the first vehicle in a second parking space of the parking lot, and a second vehicle among the plurality of vehicles that has agreed to the transaction of electricity transfer in the first parking space during the second time period exchanges parking spaces with the first vehicle such that the electricity transfer to the first vehicle will take place during the second time period in the first parking space and the electricity transfer to the second vehicle will take place during the second time period in the second parking space.

* * * * *